Nov. 10, 1959 N. H. SHEPHERD 2,912,569
COMMUNICATION SYSTEM WITH AUTOMATIC AMPLITUDE CONTROL
Filed Nov. 30, 1955
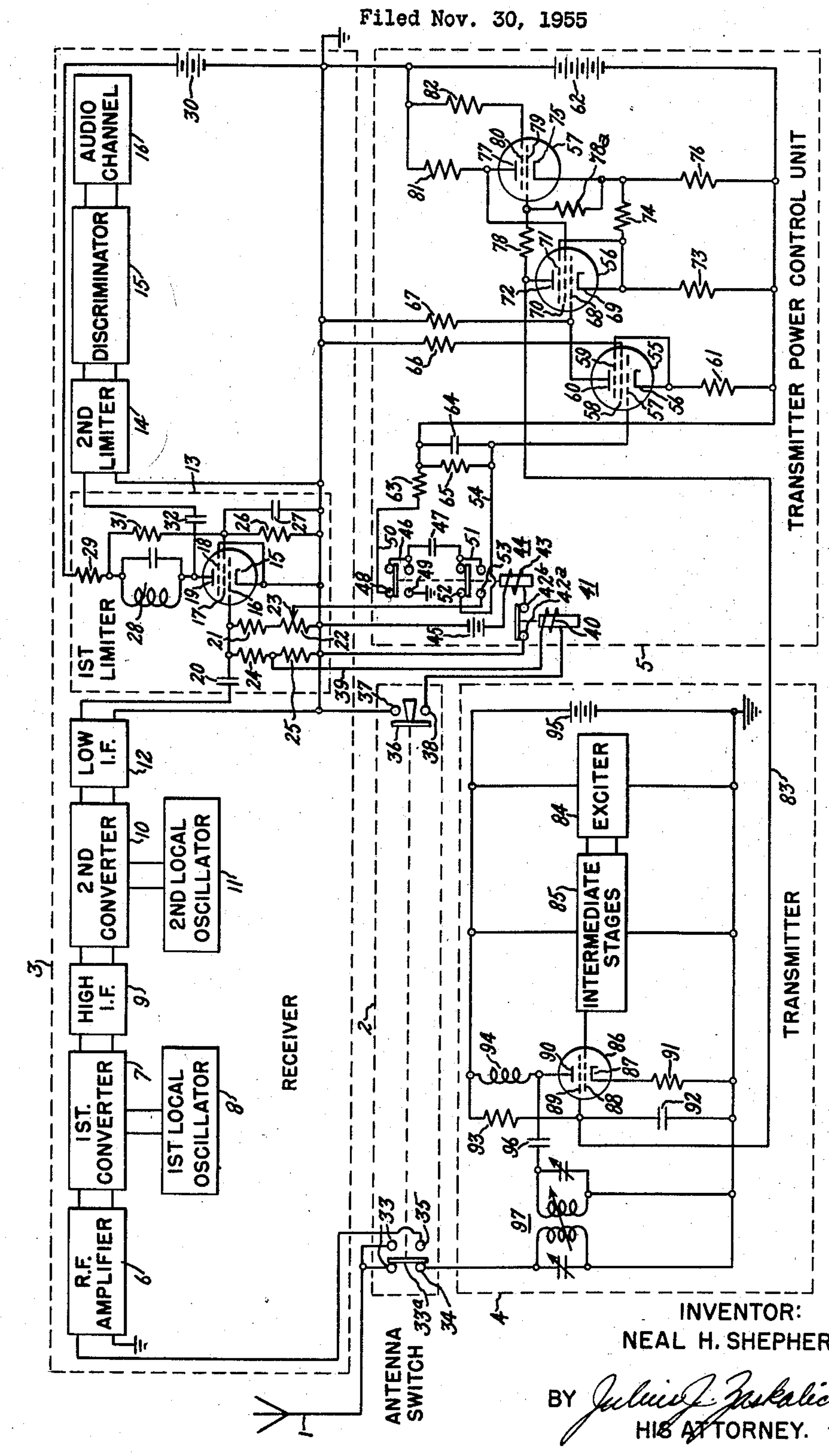
INVENTOR:
NEAL H. SHEPHERD,
BY Julius J. Zaskalicky
HIS ATTORNEY.

2,912,569

COMMUNICATION SYSTEM WITH AUTOMATIC AMPLITUDE CONTROL

Neal H. Shepherd, Syracuse, N.Y., assignor to General Electric Company, a corporation of New York Application November 30, 1955, Serial No. 549,980

9 Claims. (Cl. 250—13)

The present invention relates to two-way communication systems and has as an object thereof to provide in such systems means for controlling the intensity of transmission from one station to another inversely in accordance with the intensity of reception from said other station by said one station.

An advantage of such an arrangement is that sufficient intensity of transmission is had for good communication between a pair of stations, yet not so intense as to be excessive and cause co-channel, adjacent-channel and intermodulation interference in other communication systems.

Another advantage of such an arrangement is that the life of transmission apparatus is prolonged in that transmitters are not operated at large outputs any more than is necessary.

In carrying out the present invention in one form to be described, applicant provides means for deriving from the receiver at one station of such a system during the interval of reception a voltage corresponding to the intensity of carrier waves in said receiver received from a remote station with which communication is being carried on. Means are provided for applying said voltage to the transmitter at said one station during a subsequent interval of transmission to said remote station to control the intensity of the carrier waves from said one station inversely in accordance with the magnitude of said voltage.

The novel features which are believed to be characteristic of this invention are set forth with particularity in the appended claims. The invention itself, however, both as to its organization and method of operation together with further objects and advantages thereof may best be understood by reference to the following description taken in connection with the accompanying drawing in which is shown an illustrative embodiment of the present invention partially in schematic form as applied to a frequency modulation receiver.

Referring now to the single figure of the drawing, there is shown an illustrative embodiment of a transmitter-receiver unit of a two-way communication system embodying the present invention. This unit includes an antenna 1 for receiving and transmitting frequency-modulated carrier waves, an antenna switch unit 2 for switching the antenna to either the receiver 3 or transmitter 4, depending upon whether communication is being received or transmitted, and a transmitter-power control unit 5 responsive to carrier wave level at the receiver for controlling the transmitter output.

The receiver 3 comprises a radio-frequency amplifier 6, a first converter 7, a first local oscillator 8 operating in conjunction with the first converter, a high intermediate frequency amplifier 9, a second converter 10 operated in conjunction with the second local oscillator 11, and a low intermediate frequency amplifier 12. The low intermediate frequency amplifier is connected to the first limiter 13, the output of which is applied to the second limiter 14, the output from which in turn is detected by the discriminator 15. The output from the discriminator 15 is applied to the audio channel 16.

First limiter 13 comprises an electron discharge device 14*a*, including a cathode 15*a*, a grid 16*a*, a screen grid 17, a suppressor grid 18 and an anode 19. The cathode 15*a* is connected to ground. The grid 16*a* is connected through coupling capacitor 20 to one of the output terminals of the low I–F amplifier 12, the other output terminal of which is connected to ground. Grid 16*a* is also connected to ground through resistance 21 in series with resistance 22, which includes a variable tap 23. Grid 16*a* is also connected to ground through resistance 24, connected in series with resistance 25. The screen 17 is connected through resistance 26, shunted by by-pass capacitance 27 to ground. The suppressor grid 18 is connected to cathode 15*a*. The anode 19 is connected through parallel-resonant circuit 28 and through resistance 29 to the positive terminal of the source 30 of unidirectional operating potential, the negative terminal of which is connected to ground. The junction of resistance 29 and parallel-resonant circuit 28 is connected through resistance 31 to screen grid 17. Anode 19 is also connected through coupling capacitance 32 to the input of the second limiter 14, the other input terminal of which is connected to ground.

The antenna switch unit comprises two sets of contacts, one set including antenna contacts 33 connected to antenna 1, a transmitter contact 34 connected to transmitter 4, a receiver contact 35 connected to receiver 3, and an arm member 33*a* in the transmit position making contact between contacts 33 and 34 and in the receive position making contact between contacts 33 and 35. The other set of contacts includes an arm member 36, a contact 37 connected to ground, and another contact 38 connected to the control unit 5.

When the antenna switch is in the receive position, carrier waves appear in receiver 3 and are applied to the first limiter 13. The grid 16*a* being connected to ground through resistances 21, 22, 24 and 25 and the cathode 15*a* also being connected to ground results in grid current being drawn by the limiter charging up capacitance 20 which biases the grid 16*a* negatively in proportion to the magnitude of the applied carrier wave. Accordingly, at the junction of resistances 24 and 25 and at the tap 23 is obtained a negative voltage with respect to ground of a magnitude corresponding to the amplitude of the carrier wave appearing in the receiver 3.

This voltage is applied to the transmitter power control unit 5 to develop a voltage utilized for controlling the power output of a transmitter 4. Conductor 39 connects the junction of resistances 24 and 25 to one end of the coil 40 of relay 41, the other end of which is connected to contact 38 of antenna switch 2. The relay 41 includes a set of normally closed contacts 42*a* and 42*b*. Contact 42*a* is connected to ground. Contact 42*b* is connected to one end of coil 43 of relay 44. The other end of coil 43 is connected to the positive terminal of potential source 45, the negative terminal of which is connected to ground.

Relay 44 includes two sets of contacts, one set including contacts 46 connected to one electrode of capacitance 47, a normally open contact 48 connected to conductor 50, and a normally closed contact 49 connected to ground. The other set of contacts includes contacts 51 connected to the other electrode of capacitance 47, a normally open contact 52 connected to conductor 54, and normally closed contact 53 connected to the variable tap 23 on divider 22.

With the antenna switch 2 in the receive position, carrier appears at the receiver 3 and relay 41 is actuated, thereby opening normally closed contacts 42*a* and 42*b*. Thus, relay 44 is de-energized, thereby causing the capacitor 47 to be connected between the tap 23 and ground. Capacitance 47 is charged to a voltage corresponding to the magnitude of the carrier wave appearing at the receiver. Upon cessation of carrier to the receiver, relay 41 is de-energized, thereby energizing relay 44 to cause the capacitor 47 to be switched over across conductors 50 and 54.

To transmit communication, the antenna 1 is switched over to the transmit position, thereby opening the contacts 36 and 38 of antenna switch 2. At this time, the transmitter 4 is energized for communication. Some of the output from the transmitter 4 appears in the receiver 3 when the latter is operated on the same frequency as the transmitter and causes a bias to develop across the grid circuit of the first limiter. False de-energization of relay 44 is avoided in such situations by virtue of the fact that contacts 37 and 38 are located in series with coil 40 of relay 41 and are open when the antenna switch is in the transmit position.

The output appearing across conductors 50 and 54 is applied to a direct-current amplifier comprising devices 55, 56 and 57 for developing a unidirectional output which in turn is applied to the transmitter 4 for controlling the output thereof. Device 55 comprises a cathode 56*a*, a control grid 57*a*, a screen grid 58, a suppressor grid 59 and an anode 60. The cathode 56*a* is connected through cathode resistance 61 to the negative terminal of a source of unidirectional potential 62, the positive terminal of which is connected to ground. The grid 57*a* is connected to conductor 54. The negative terminal of source 62 is connected through resistance 63 to conductor 50. Capacitance 64, resistance 65 are connected in shunt between the negative terminal of source 62 and the grid 57*a*. Screen grid 58 is connected through screen grid resistance 66 to ground. Suppressor grid 59 is connected to the cathode 56*a*. The anode 60 is connected through anode resistance 67 to ground and also to grid 68 of device 56 which also includes a cathode 69, a screen grid 70, a suppressor grid 71 and anode 72. The cathode 69 is connected through cathode resistance 73 to the negative terminal of source 62 and also connected through resistance 74 to the cathode 75 of device 57. Cathode 75 is connected through cathode resistance 76 to the negative terminal of source 62. The screen grid 70 is connected to the anode 77 of device 57. The suppressor grid 71 is connected to cathode 69. The anode 72 is connected through resistance 78 to grid 79 of device 57. Grid resistance 78*a* is connected between grid 79 and cathode 75. Screen grid 80 of device 57 is connected through load resistance 82 to ground. Anode 77 is connected through the load resistance 81 to ground.

In operation, when the system is switched to the transmit position, the charge on capacitance 47 is applied to grid 57 of tube 55 through the parallel combination of capacitance 64 and resistance 65. It is readily seen that the time constant determined by the values of the components of this parallel combination in conjunction with capacitance 47 will determine the interval of application of voltage from capacitance 47 to grid 57. Thus, depending upon the circuit valves chosen, the influence of the latter voltage may be utilized in a transmission interval immediately following a reception interval extending from a very short time to an interval of several minutes. Also, it will be recalled that conductor 50 is positive with respect to 54 and that the difference in potential thereacross is representative of the amplitude of carrier wave appearing in the receiver. Accordingly, as the amplitude of received carrier increase 50, the grid 57*a* is rendered increasingly negative, thereby causing an increase in a positive direction of the potential on anode 60. An increase in potential on anode 60 causes an increase in current through device 56, thereby lowering the potential at the anode 72 of this device. The potential at anode 72 is applied over conductor 83 to the transmitter 4 for controlling the output thereof. Device 57 functions as a feedback device for augmenting the potential effect appearing at the anode 72. With a large decrease in voltage at the anode 72, grid 79 of device 57 is driven negative, thereby increasing the potential at the anode 77 which, being connected to the screen grid 70, causes a further increase in current through the device 56, thereby further lowering the potential of the anode 72. Consequently, it is seen that device 57 functions in a positive feedback circuit to augment the potential effect appearing at the anode 72.

As previously mentioned, the potential appearing at anode 72 is applied over conductor 83 to the transmitter 4 which comprises an exciter portion 84, a group of intermediate stages and modulator stages 85, and an output stage. The output stage includes device 86 having a cathode 87, a control grid 88, a screen grid 89 and an anode 90. Cathode 87 is connected to ground through cathode resistance 91. The grid 88 is connected to the output of the intermediate stages 85. The screen grid 89 is connected through screen by-pass capacitance 92 to ground and through resistance 93 to the positive terminal of source of operating potential 95, the negative terminal of which is connected to ground. Source 95 also supplies operating potential to the exciter 84 of intermediate stages 85. The anode 90 is connected through anode load choke 94 to the positive terminal of source 95. Conductor 83 from the transmitter control unit is connected to the screen grid 89.

Variation in the potential on the screen device 89 varies the power obtained from the device 86. The anode 90 of device 86 is coupled through capacitor 96 to the input of tuned output circuit 97, the output of which is applied to the contact 34 of the antenna switch.

Accordingly, it is seen that applicant has provided means for automatically limiting the output power level of the transmitter to a value dependent upon the amplitude of the carrier received, which amplitude will, of course, vary with transmission conditions and other such factors. By the means applicant has provided, amplitude of transmission is limited to that value which is required for good communication, thereby minimizing the interference of such transmission with other equipment operating on the same channel and adjacent channels. Also, in so limiting the power put out from the transmitter to a value necessary for good communication, life of the components of the transmitter is conserved.

Applicant's invention has been illustrated in connection with a frequency-modulation transmitter and receiver unit. It is equally applicable to systems generically denoted as angular-modulation systems.

While applicant has utilized voltage obtained from the first limiter of a communications receiver for effectuating the control function, it will be understood that any means for rectifying the carrier or obtaining a voltage representative of carrier amplitude could as well be used.

While I have shown a particular embodiment of my invention, it will, of course, be understood that I do not wish to be limited thereto since many modifications both in the circuit arrangement and in the instrumentalities employed may be made, and I, therefore, contemplate by the appended claims to cover any such modifications that come within the true spirit and scope of my invention.

What I claim as new and desire to secure by Letters Patent of the United States is:

1. In combination, in a frequency-modulated communication system, a receiver including an amplitude limiter adapted to receive a frequency-modulated carrier wave from a remote point, a transmitter for transmitting frequency-modulated waves to said point, switching means for selectively maintaining said transmitter inoperative during intervals of reception of carrier waves from said point and for selectively maintaining said receiver imperative during intervals of transmission of carrier waves to said point, means for deriving from said amplitude limiter during an interval of reception a voltage corresponding to the intensity of carrier waves received from said remote point, means for applying said voltage to said transmitter during a subsequent interval of transmission to said point to control the intensity of said carrier wave inversely in accordance with the magnitude of said voltage.

2. In combination, in a frequency-modulated communication system, a receiver including an amplitude limiter adapted to receive modulated carrier waves of a particular frequency from a remote point, a transmitter for transmitting frequency-modulated waves of said frequency to said point, switching means for selectively maintaining said transmitter inoperative during intervals of reception of carrier waves from said point and for selectively maintaining said receiver imperative during intervals of transmission of carrier waves to said point, means for deriving a unidirectional voltage from said receiver corresponding to the amplitude of the carrier received by said receiver including a capacitance connected in circuit with said limiter during said reception intervals and across which said unidirectional voltage appears, means for switching said capacitance in circuit with said transmitter during a subsequent interval of transmission to said point to control the intensity of the carrier wave inversely in accordance with the magnitude of said voltage.

3. In a communication system comprising a first station for transmitting signals to and receiving signals from a second station, said first station comprising a first transmitter and a receiver, an antenna for receiving and transmitting frequency modulated carrier waves, an antenna switch unit comprising means to selectively switch the antenna to the receiver and the transmitter in accordance with communication being received and transmitted respectively and a second switch unit means, a transmitter power control unit responsive to carrier wave level at the receiver for controlling the first transmitter output, said receiver comprising a first converter, a first local oscillator operating in conjunction with said first converter, a high intermediate frequency amplifier responsive to the output of said first converter, a second converter responsive to the output of said first converter, a second local oscillator operated in conjunction with said second converter, a low intermediate frequency amplifier responsive to the output of said second converter, a first limiter comprising an electron discharge device having a cathode, anode, and control electrode and a second limiter, said first limiter being responsive to the output of said low intermediate frequency amplifier and said second limiter being responsive to the output of said first limiter, a first relay means, said second switch unit means being disposed in closed position between ground and said first relay means, said first limiter being biased to draw grid current in the receiver position of the antenna switch, a first capacitor disposed between the output of said low intermediate frequency amplifier and the grid of said first limiter to thereby charge up said first capacitor in relation to the signal from said low intermediate frequency amplifier to bias the grid of said first limiter negatively in proportion to the magnitude of the applied carrier wave, means to obtain a negative voltage from said first limiter grid in accordance with a magnitude corresponding to the amplitude of the carrier wave appearing in said receiver, said transmitter power control unit comprising said first relay, a second relay, said first relay being connected to said second antenna switch means to be energized with the antenna switch in the receive position because of closing of the second antenna switch means, said first relay having a contact to close the circuit of said second relay to thereby cause de-energization of said second relay when said first relay is energized, a second capacitor charged to a voltage corresponding to the magnitude of the carrier wave appearing at the receiver, cessation of the carrier to the receiver causing de-energization of said first relay to thereby energize said second relay to cause said second capacitor to be switched across the input of said transmitter power control unit, cessation of the carrier to the receiver being effected by switching said antenna to transmitter position, said transmitter power control unit comprising a direct current amplifier, said second capacitor being disposed across the input of said direct current amplifier to develop a uni-directional output in accordance with said second capacitor voltage across its input, said transmitter having its output responsive to the unidirectional output of said direct current amplifier to thereby control the transmitter output inversely with respect to the intensity of reception at the receiver input.

4. A communication system comprising a receiver, including an amplitude limiter, for receiving signals from a remote source, a transmitter for transmitting signals to said source, switching means for simultaneously selectively rendering said transmitter operative and said receiver inoperative and for simultaneously rendering said receiver operative and said transmitter, inoperative, means in circuit with said transmitter and said receiver for controlling the intensity of the output of said transmitter during a transmission interval substantially inversely in accordance with the intensity of a received signal in a reception interval immediately preceding said transmission interval, means for deriving a substantially undirectional voltage from said limiter during a reception interval having an amplitude in accordance with the intensity of a received signal, and means for applying said derived voltage to said control means simultaneously with the rendering operative of said transmitter for a transmission interval and for maintaining the application of said derived voltage to said control means for said last named transmission interval.

5. A communication system as defined in claim 4 wherein said switching means comprises means for conditioning said system either for reception or for transmission, for rendering operative said means for deriving said voltage during a reception interval, and for applying said derived voltage to said control means during a next succeeding transmission interval.

6. A communication system as defined in claim 4 wherein said limiter comprises an electron discharge device having a cathode, an anode and a control electrode, wherein said derived voltage is produced at the control electrode of said limiter during a reception interval and wherein said means for deriving said voltage includes, a first capacitance selectively inserted in circuit with said control grid during reception intervals and with said control means during transmission intervals, said capacitance charging during a reception interval to a voltage substantially in accordance with the intensity of a received signal.

7. A communication system as defined in claim 6 wherein said control means comprises a cascaded arrangement of first and second amplifiers, each of said amplifiers comprising respective electron discharge devices, each of said discharge devices having an anode, cathode and control electrode, wherein said transmitter includes an output stage comprising an electron discharge device having an anode, cathode, control grid and screen grid, wherein the output of said second amplifier is applied to said screen grid and wherein said voltage is applied to the control grid of said first amplifier from the negative side of said capacitance whereby said output from said second amplifier is inversely in accordance with the intensity of said received signal.

8. A communication system as defined in claim 6 wherein said control means comprises a cascaded arrangement of a first amplifier comprising an electron discharge device having a first anode, a first cathode, and a first control grid, a second amplifier comprising a second electron discharge device having a second anode, a second cathode, a second control grid and a first screen grid, and a third amplifier comprising a third anode, a third cathode and a third control grid, wherein said transmitter includes an output stage comprising a fourth amplifier having a fourth anode, a fourth cathode, a fourth control grid and a second screen grid, wherein said derived voltage is applied to said first control grid, where the output of said second amplifier is applied to said second screen grid and wherein the output of said third amplifier is fed back to said first screen grid whereby the output of said second amplifier is inversely in accordance with the intensity of said received signal and whereby said fed-back output of said third to said second amplifier augments the potential effect appearing at the output of said second amplifier.

9. A communication system as defined in claim 8 wherein said means for applying said derived voltage to said control means includes a parallel combination of a resistance and second capacitance connected to said first control grid which is inserted in parallel arrangement with said first capacitance upon the rendering operative of said transmitter.

References Cited in the file of this patent

UNITED STATES PATENTS

| | | |
|---|---|---|
| 2,454,396 | Malling | Nov. 23, 1948 |
| 2,530,418 | Alvarez | Nov. 21, 1950 |
| 2,546,987 | Eannarino | Apr. 2, 1951 |